July 21, 1953  D. R. GAVERTH ET AL  2,646,097
AUTOMOBILE COVER

Filed Dec. 22, 1950  3 Sheets-Sheet 1

INVENTORS:
Delbert R. Gaverth
Albert Erickson
By
Attorney

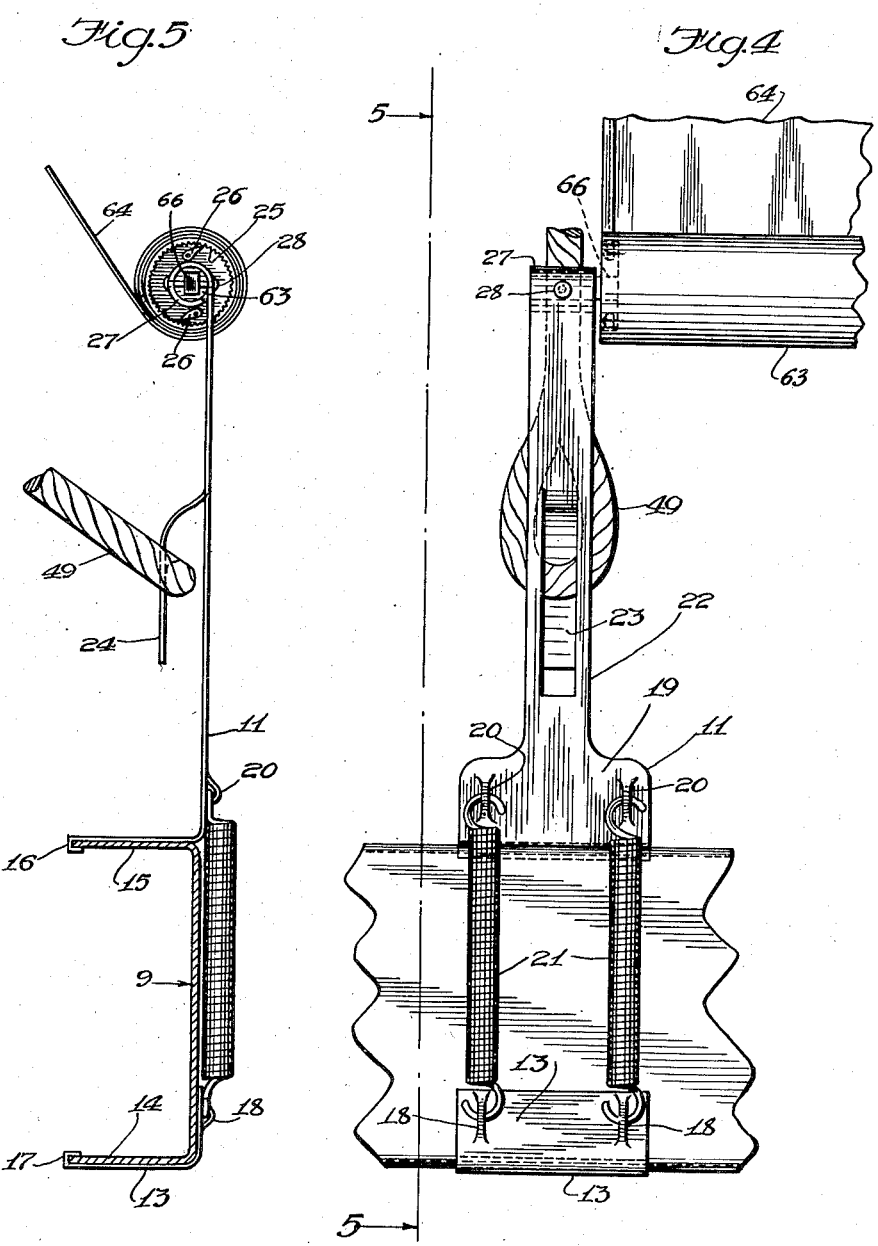

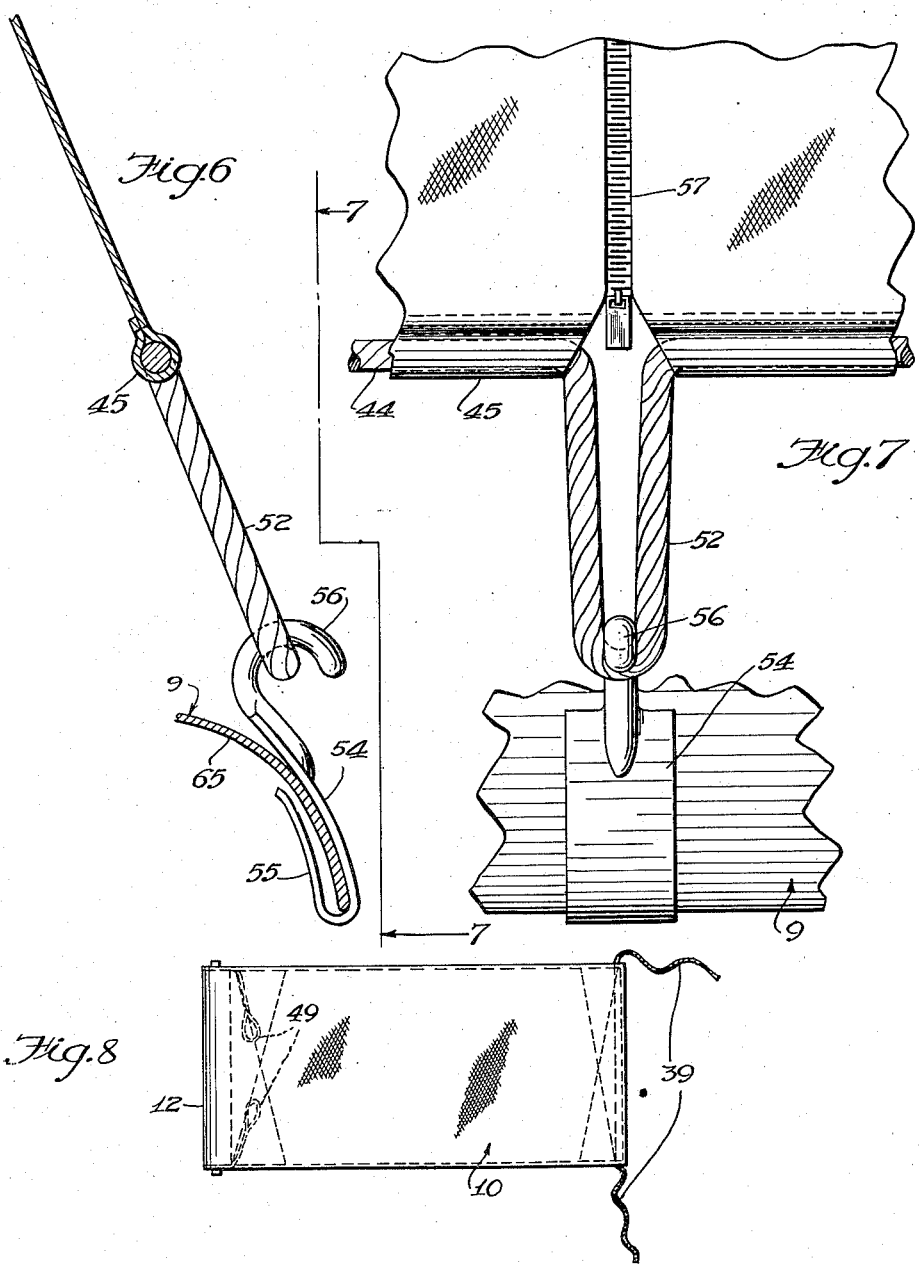

Patented July 21, 1953

2,646,097

UNITED STATES PATENT OFFICE 2,646,097

AUTOMOBILE COVER

Delbert R. Gaverth, Des Plaines, and Albert Erickson, Chicago, Ill.

Application December 22, 1950, Serial No. 202,316

3 Claims. (Cl. 150—52)

1

Our invention relates to automobile covers, particularly the type which is designed to cover substantially the entire body of a vehicle, and which is also equipped so that it may be folded and rolled away in compact form at the rear in a casing supported by, or attached to, the vehicle or automobile.

An important object of our invention is to provide a cover for vehicles of the aforementioned character which will protect the said vehicle from damage by the elements, namely, rain, sleet, snow, sun, and thus protect the finish of the body of the vehicle.

Another important object of our invention is to provide a cover which consists of a central substantially rectangular portion having two centrally positioned rectangular portions on its sides of smaller dimension than the first-mentioned rectangular section, and at each end adjacent the said smaller rectangular sections gored sections which are positioned so as to afford openings between the said gored sections and the said centrally positioned smaller rectangular sections, and slide fastener means for closing the said central openings in order to form a cover which will configuratively fit the shape of a vehicle.

A still further object of our invention is to provide cover means of the aforementioned character which may be folded so as to permit rolling up of the same in a case which is supported on the rear bumper of a vehicle.

Still a further object of our invention is to provide compact roll-away cover means for vehicles which is supported by universally adjustable brackets which will fit bumpers of various sizes, the said bracket structure being constructed of two elements held together by resilient means so as to afford extension and retraction clamp means to straddle the varied widths of bumpers utilized.

A further object of our invention is to provide rope tieing and securing means at the front and rear of the said cover means which will not interfere with compactly folding the cover means and rolling it up in the case or container provided therefor, the said rope means being utilized to anchor the extreme front and rear portions of the said cover means so as to form a tight compact cover over the vehicle to which it may be secured.

A still further object of our invention is to provide vehicle cover means of the aforementioned character which is simple in construction, practical for the purposes for which it is purported to be used, and of such simple elemental construction as to warrant economical manufacture thereof in quantity production.

Other features and objects embraced in our invention will become readily apparent from an examination of the accompanying drawings bearing further elucidation in the following description, wherein like symbols are used to designate like parts, and in which;

Fig. 4 is a view looking in the direction of arrows 4—4 on Figure 1, the outer casing 12 being omitted for clarity.

Fig. 5 is a view looking in the direction of arrows 5—5 on Figure 4 and shown partly in cross-section, the outer casing 12 being omitted for clarity.

Fig. 6 is a sectional view taken substantially on the lines 6—6 of Figure 1.

Fig. 7 is an enlarged view looking in the direction of arrows 7—7 on Figure 6.

Fig. 8 is a view similar to Figure 3 with the exception that the cover is indicated in Figure 8 in folded position preparatory to rolling up the same within the confines of the casing 12.

Figure 1:
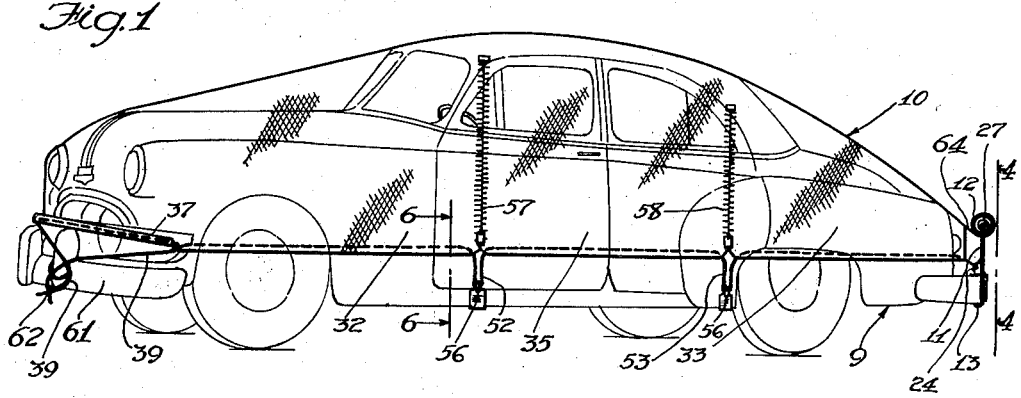
Fig. 1 represents a perspective view of a vehicle shown in phantom lines, to which a cover, such as is contemplated by our invention, is secured.
Figure 2:
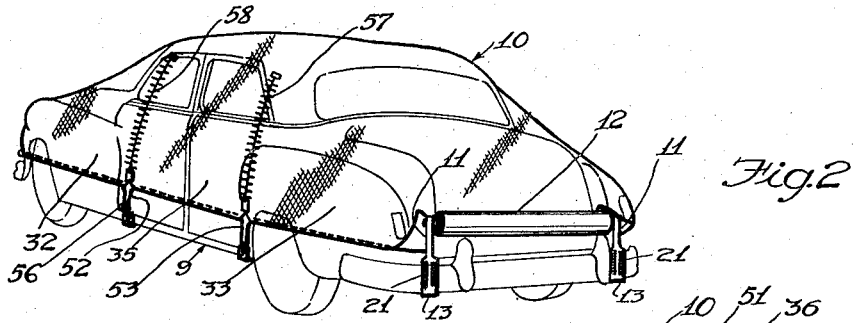
Fig. 2 is a perspective view of a vehicle looking from the rear thereof; and is similar to Figure 1 showing the cover in place on a vehicle.
Figure 3:
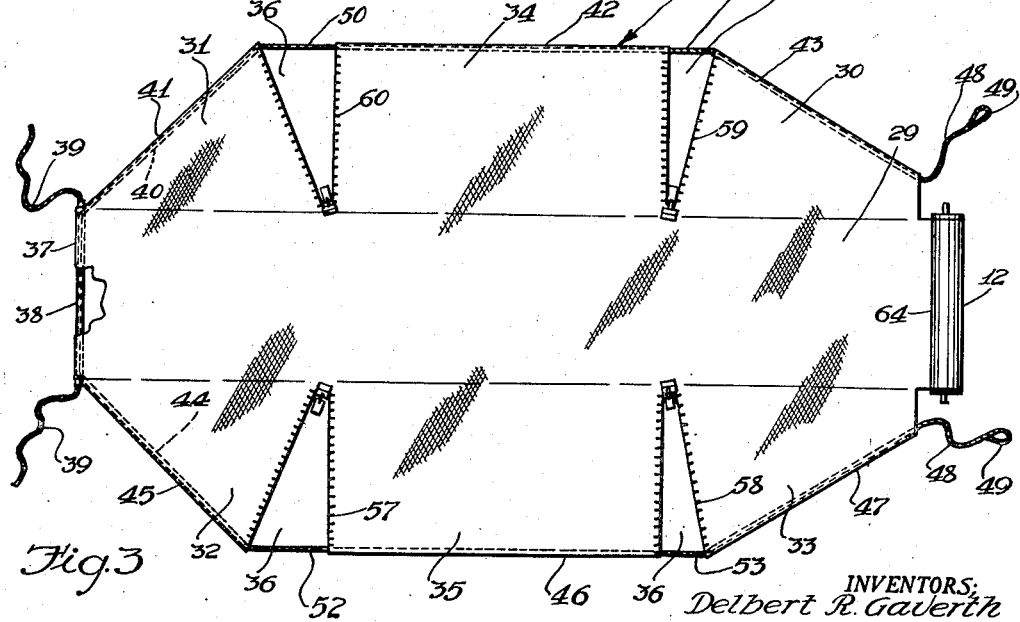
Fig. 3 is a development or normal layout of the cover structure per se shown in connection with the casing in which it may be rolled up, or from which it may be unrolled, preparatory to covering or exposing a vehicle.

Referring to the various views, our invention is, generally, designated 10, and is designed to fit a vehicle, generally, designated 9. The cover structure 10 is adapted to be rolled up within a casing 12 supported on the rear bumper of a vehicle by brackets 11 and angular brackets 13. The rear bumper, as can be seen in Figures 4 and 5, is of U-shaped construction having an upper support flange 15 and a lower support flange 14. The upper bracket 11 is provided with a reduced leg 22 extending upwardly in order to form a bearing 27 securing a polygonal shaft 66 about which a spring roller 63 is rotatably mounted within the casing 12.

The polygonal shaft 66 is secured by means of rivets or other similar fastenings designated 28 to the bearing portions 27. A ratchet 25 and gravity actuated pawls 26, which are articulately positioned within the casing 12 to engage the ratchet 25, are so designed as to afford a releaseable locking engagement similar to a window shade roller construction. The spring actuated roller 63 is secured to edge 64 of a central rectangular section 29 of the cover 10. The bracket 11 is provided with a large angularly formed portion 19 which extends to form a U-shaped portion 16 at its end which will engage the flange 15. The said enlarged angular portion 19 merges with a reduced upright leg or support portion 22 having an opening 23 therein from which a holding or retaining lug 24 is formed. The province of this retaining lug 24 is to receive in anchorage the loop 49 of rope ends 48 which are secured to the cover 10.

The lower bracket 13 operates in concert with the bracket 11 in order to straddle the opposed flanges 14 and 15 of a bumper structure. The lower bracket 13 is of angular formation, as indicated, so as to form a U-shaped portion 17 engaging the end of the flange 14. Both brackets 11 and 13 are provided with formed loops 18 and 20 which furnish anchorage for closely wound springs 21, so that the brackets 11 and 13 can be pulled apart or retracted by the springs 21 in order to form a compact and straddling grip over the flanges 14 and 15 of the bumper structure hereinbefore mentioned.

The cover structure consists of a central substantially rectangular panel 29 having formed in transverse relationship therewith two centrally positioned rectangular portions 34 and 35. Adjacent the smaller rectangular portions 34 and 35 are shown substantially gore-like portions 30, 31, 32 and 33, resulting in the formation of triangularly shaped openings 36. At the edges of the triangular openings 36 separable fastener means 57, 58, 59 and 60 are provided with suitable slider elements for closing the said openings 36. The forward portion of the central rectangular panel 29 is provided with a sheath-like arrangement 37, in which a tubular connection or reinforcement 38 is secured to operate as a retaining means for a front tieing rope 39. Throughout the perimetral portion of the sides of the gore portions 30, 31, 32 and 33, as well as the central rectangular portions 34 and 35, a rope 40 is secured in pockets 41, 42 and 43, whereas in pockets 45, 46 and 47 a similar rope element 44 is secured, both ropes terminating in the loose ends 48 having the looped portions 49 which are to be readily engaged or disengaged in anchorage with the hook or lug means 24.

It will be noted that exposed rope portions 50, 51, 52 and 53 are provided which may be looped as shown in Figures 6 and 7 so that the same will engage hooks 56 provided with attaching flattened portions 54 bent at 55 configurative with an apron 65 of the vehicle 9 to hold the said hooks firmly in place.

In actual use and operation the casing 12, which contains the wound-up or coiled cover 10, is positioned on the rear bumper when the cover 10 is rolled up therein, the portion 37 and the rope 39 remaining exposed outside the confines thereof. The said rope 39, as well as the reinforced portion 37, is grasped and pulled over the top of the vehicle 9, and when first pulled out will be brought out in folded position, as indicated in Figure 8. The sections 34, 35, and 30, 31, 32 and 33 are then unfolded and dropped over the sides of the vehicle 9. The exposed rope portions 50, 51, 52 and 53 are then pulled downwardly and hooked on to the respective hooks 56 provided therefor and which are attached to the vehicle 9.

The next step is to anchor the loops 49 on the hooks 24, as indicated, and the slide fasteners 57, 58, 59 and 60 are closed. The final step of the operation is to grasp both ends of the rope 39 at the front and pull tautly on the same in order to take up any slack in the cover and then tie the same in knotted formation, as indicated at 62 on the front of bumper 61. To conceal the cover the reverse of the foregoing operation is resorted to, namely, the knot 62 is untied from its support on the bumper 61. The exposed rope portions 50, 51, 52 and 53 are released from hooking engagement with the hooks 56. The slide fasteners 57, 58, 59 and 60 are opened. Then the gore portions 30, 31, 32 and 33 are folded over the central rectangular portion 29, and the smaller rectangular portions 34 and 35 are also folded over the central rectangular portion 29, so that the result indicated in Figure 8 is attained. Then by grasping the rope 39 or the reinforcement 37 the pawls 26 are caused to become disengaged from the ratchet 25 holding the same in place, and the spring action will draw the entire cover means 10 confining it within the casing 12. The reinforcement 37 and the rope 39 remain exposed for subsequent repetition of the cycle of operation when it is desired to cover the vehicle to prevent it from exposure to the elements.

It is to be understood that changes may be made in the construction and in the combination and arrangement of the several parts, provided that such changes fall within the scope of the appended claims.

Having thus disclosed and revealed our invention, what we claim as new and desire to secure by Letters Patent is:

1. Automobile cover means fitting substantially configuratively the body of a vehicle, comprising a cover element including a central rectangular section, a pair of substantially smaller rectangular portions extending centrally and in transverse relationship from two opposite laterals of the said central rectangular section, and gore portions extending from the said two opposite laterals and positioned adjacent the said smaller rectangular portions defining triangularly-shaped openings between adjacent laterals of the said smaller rectangular portions and the said gore portions when the said cover is disposed in a single plane.

2. Automobile cover means fitting substantially configuratively the body of a vehicle, comprising a cover element including a central rectangular section, a pair of substantially smaller rectangular portions extending centrally and in transverse relationship from two opposite laterals of the said central rectangular section, gore portions extending from the said two opposite laterals and positioned adjacent the said smaller rectangular portions defining triangularly-shaped openings between adjacent laterals of the said smaller rectangular portions and the said gore portions when the said cover is disposed in a single plane, and fastener means secured to the said adjacent laterals to form a hood-like enclosure when the said fastener means are closed.

3. Automobile cover means fitting substantially configuratively the body of a vehicle, comprising a cover element including a central rectangular section, a pair of substantially smaller rectangular portions extending centrally and in transverse relationship from two opposite laterals of the said central rectangular section, gore portions extending from the said two opposite laterals and positioned adjacent the said smaller rectangular portions defining triangularly-shaped openings between adjacent laterals of the said smaller rectangular portions and the said gore portions when the said cover is disposed in a single plane, single rope means connecting perimetrally the outer laterals of the said smaller rectangular portions and the said gore portions terminating in looped extensions simultaneously exposing intermediate rope portions to form bases for the said triangularly-shaped openings adapted to be removably secured to hook means.

DELBERT R. GAVERTH.
    ALBERT ERICKSON.

References Cited in the file of this patent

UNITED STATES PATENTS

| Number | Name | Date |
|---|---|---|
| 1,719,055 | Herzer | July 2, 1929 |
| 1,905,973 | Levine | Apr. 25, 1933 |
| 1,912,231 | Wandscheer | May 30, 1933 |
| 1,918,423 | Persinger | July 18, 1933 |
| 2,248,655 | Bila | July 8, 1941 |
| 2,279,812 | Bartlett | Apr. 14, 1942 |
| 2,363,917 | Waterman et al. | Nov. 28, 1944 |
| 2,497,596 | Frieder et al. | Feb. 14, 1950 |